United States Patent [19]

Stearns

[11] Patent Number: 5,842,191
[45] Date of Patent: Nov. 24, 1998

[54] NEURAL NETWORK THAT INCORPORATES DIRECT OPTICAL IMAGING

[75] Inventor: Richard G. Stearns, Los Gatos, Calif.

[73] Assignee: Xerox Corporation, Stamford, Conn.

[21] Appl. No.: 922,798

[22] Filed: Sep. 3, 1997

Related U.S. Application Data

[63] Continuation of Ser. No. 354,572, Dec. 12, 1994, abandoned.

[51] Int. Cl.⁶ .................................................. G06F 15/18
[52] U.S. Cl. ............................................................... 706/40
[58] Field of Search ................................ 395/25; 706/40

[56] References Cited

U.S. PATENT DOCUMENTS

| | | | |
|---|---|---|---|
| 4,762,397 | 8/1988 | Pepper | 350/331 |
| 4,892,370 | 1/1990 | Lee | 350/3.74 |
| 4,963,725 | 10/1990 | Hong et al. | 250/201.9 |
| 5,080,464 | 1/1992 | Toyoda | 359/559 |
| 5,129,040 | 7/1992 | Hanazato et al. | 395/25 |
| 5,220,642 | 6/1993 | Takahashi et al. | 395/25 |
| 5,255,362 | 10/1993 | Brandstetter et al. | 395/163 |
| 5,428,711 | 6/1995 | Akiyama et al. | 395/25 |
| 5,515,189 | 5/1996 | Kuratomi et al. | 359/72 |

OTHER PUBLICATIONS

Applied Optics, vol. 32, No. 26, Sep. 10, 1993, "Optically Programmed Neural Network Capable of Stand–Alone Operation", pp. 5141–5152, by R.G. Stearns.

Optoelectronics Devices and Technologies, vol. 8, No. 1, Mar. 1, 1993, "Optical Neuro–Devices", pp. 35–52, by Kazuo Kyuma, et al.

Stearns, Richard G., "Trainable Optically Programmed Neural Network," Applied Optics, vol. 31, No. 29, pp. 6230–6239, Oct. 10, 1992.

Stearns, Richard G. et al., "Two–Dimensional Amorphous–Silicon Photoconductor Array for Optical Imaging," Applied Optics, vol. 31, No. 32, pp. 6874–6881, Nov. 10, 1992.

Rietman, Edward A. et al., "Signal Prediction by an Optically Controlled Neural Network," Applied Optics, vol. 30, No. 8, pp. 950–957, Mar. 10, 1991.

Rietman, Edward A. et al., "Amorphous Silicon Photoconductive Arrays for Artificial Neural Networks," Applied Optics, vol. 28, No. 15, pp. 3474–3478, Aug. 15, 1988.

Stearns, Richard G., "A Neural Network That Incorporates Direct Optical Imaging," pp. 1–27, submitted for publication, but not published.

Stearns, Richard G., "An Optically–Programmed Neural Network Capable of Standalone," Applied Optics, pp. 1–42, Apr. 1993.

Rumelhart, D.E. et al., "Learning Internal Representations by Error Propagation," Parallel Distributed Processing, D.F., vol. 1, Chap. 8, pp. 319–339, 1986.

Lippmann, Richard P., "An Introduction to Computing With Neural Nets," IEEE ASSP Magazine, pp. 4–22, Apr. 1987.

(List continued on next page.)

*Primary Examiner*—Allen R. MacDonald
*Assistant Examiner*—Sanjiv Shah
*Attorney, Agent, or Firm*—Fay, Sharpe, Beall, Fagan, Minnich & McKee

[57] ABSTRACT

A compact neural network architecture is trainable to sense and classify an optical image directly projected onto it. The system is based upon the combination of a two-dimensional amorphous silicon photoconductor array and a liquid-crystal spatial light modulator. Appropriate filtering of the incident optical image upon capture is incorporated into the net work training rules, through a modification of the standard backpropagation training algorithm. Training of the network on two image classification problems is described: the recognition of handprinted digits, and facial recognition. The network, once trained is capable of standalone operation, sensing an incident image and outputting a final classification signal in real time.

27 Claims, 15 Drawing Sheets

OTHER PUBLICATIONS

Widrow, Bernard et al., "Neural Nets for Adaptive Filtering and Adaptive Pattern Recognition," Computer, pp. 25–39, Mar. 1988.

Nguyen, Derrick H. et al., "Neural Networks for Self–Learning Control Systems," Control Systems Magazine, pp. 18–23, Apr. 1990.

Widrow, Bernard et al., "30 Years of Adaptive Neural Networks: Perceptron, Madaline, and Backpropagation," Proceedings of the IEEE, vol. 78, No. 9, pp. 1415–1442, Sep. 1990.

Stearns, Richard G., "A Neural Network That Incorporates Direct Optical Imaging," pp. 1–27, Jan. 24, 1994.

CONNECTIONS FROM LAYER K TO LAYER J

RECURRENT CONNECTIONS
WITHIN LAYER K

RECURRENT CONNECTIONS
WITHIN LAYER J

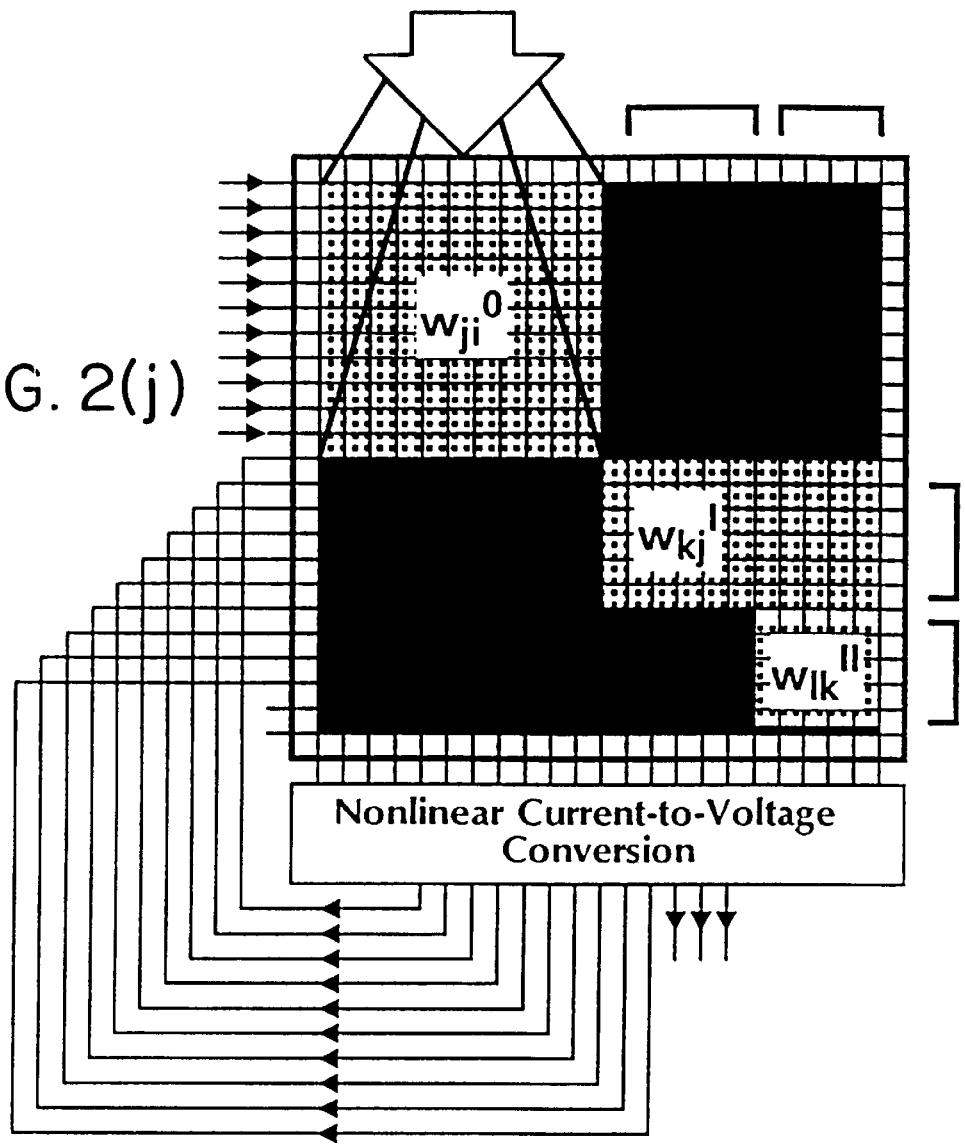
FIG. 2(j)
Nonlinear Current-to-Voltage Conversion
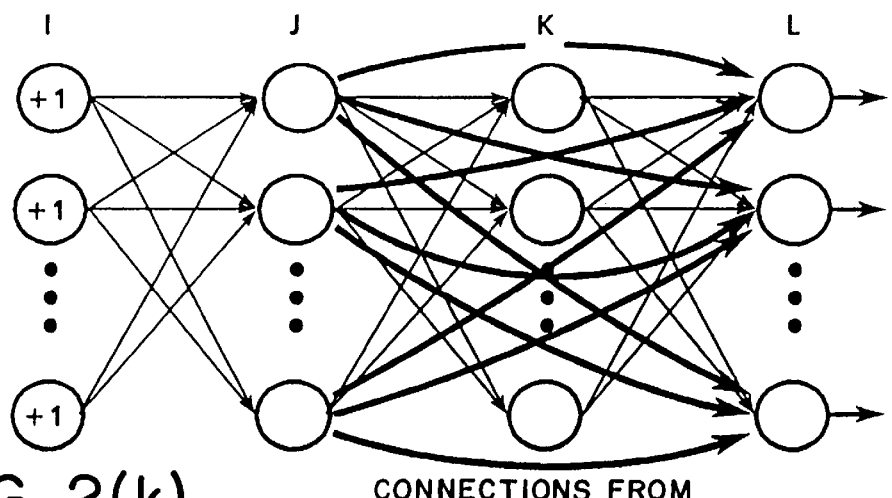
FIG. 2(k)   CONNECTIONS FROM LAYER J TO LAYER L

   
FIG. 6(a)   FIG. 6(b)   FIG. 6(c)   FIG. 6(d)
 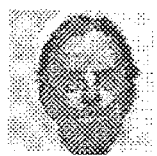  
FIG. 6(e)   FIG. 6(f)   FIG. 6(g)   FIG. 6(h)

    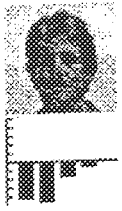
FIG. 9(a)    FIG. 9(b)    FIG. 9(c)    FIG. 9(d)    FIG. 9(e)
    
FIG. 9(f)    FIG. 9(g)    FIG. 9(h)    FIG. 9(i)    FIG. 9(j)

NEURAL NETWORK THAT INCORPORATES DIRECT OPTICAL IMAGING

This is a continuation of U.S. application Ser. No. 08/354,572 filed Dec. 12, 1994 now abandoned.

BACKGROUND OF THE INVENTION

This application pertains to the art of neural networks, and more particularly to neural networks which integrate direct optical imaging.

The invention is particularly applicable to extraction of information from visual images and will be described with particular reference thereto. However, it will be appreciated that the invention has broader applications, such as in efficient fabrication of any neural network.

The field of artificial intelligence-based computing is expanding rapidly. Many of the fundamental concepts that have been developed in the last few years, are already reaching the stage of second or third generation in sophistication. One such area is the subdivision of artificial intelligence comprising neural networks.

A first generation neural network requires functional, digital computing units which were interconnected by weighting values. Such functional units could be comprised of independent hardware processors, or alternatively implemented by software. In either instance, complex and extensive digital computing power was required.

More recently, it has been recognized that neural networks may be realized by a combination of electronics and optics. In such systems, a combination of photoconductive elements and lighting applied thereto was implemented to create a neural network. See, for example, Stearns, Richard G., Trainable Optically Programmed Neural Network, Applied Optics, Vol. 31, No. 29, Oct. 10, 1992, pp. 6230–6239.

In this system, operation of a neural network with optically-addressed weighting, constructed from a two-dimensional photoconductor array that is masked by a liquid-crystal display (LCD) was provided. A fully trainable three-layer perception network was demonstrated using this architecture, which was capable of operating in a completely standalone mode, once trained. In the previous work, data was input to the network electronically, by applying voltages to the photoconductor array.

The present system teaches how such a network architecture may be extended to allow direct optical input. Once trained, the network is capable of processing in real time an image projected onto it, in a completely standalone mode.

Artificial neural networks appear to be naturally suited to a number of image processing problems, including for example pattern recognition. This results in part from their inherent parallel architecture, as well as their ability to perform well in the presence of image noise and degradation. It would follow that a compact hardware architecture that could combine optical image capture and neural network processing would be of significant interest. The subject application teaches such an architecture, which combines real-time image capture and neural network classification within a single processing module.

SUMMARY OF THE INVENTION

In accordance with the subject invention, there is provided an optically-addressed neural network system which includes a two-dimensional array of photoconductors which define a plurality of nodes. A light shutter, such as a liquid crystal device, is also formed from a controllable, two-dimensional array of areas. Data is input to the two-dimensional array of photoconductors by directly projecting an optical image onto the network. Outputs thereof are provided along vertical conductors. The LCD is controlled so as to prevent any light from an associated, relatively collimated light source, from impinging all but selected, rectangular areas of the two-dimensional photoconductor array. The vertical lines are connected to an amplifier and a portion are returned to horizontal lines of the array in a feedback relationship. A system input is provided to one unmasked portion of the two-dimensional photoconductor array. An output is provided from those lines from the amplifier which have not been feedback to the array. Selective control of the LCD allows for manipulating of weights for various nodes, thus allowing the efficient and compact creation of a neural network.

In accordance with a more limited aspect of the subject invention, the input lines are provided by an image capture mechanism disposed within the two-dimensional array of photoconductors itself.

In accordance with another aspect of the present invention, a method is provided for accomplishing neural computing with the above-summarized structure.

An advantage of the present invention is the provision of a highly efficient, compact neural network system.

Yet another advantage of the present invention is the provision of a highly-integrated image recognition system.

Yet a further advantage of the present invention is the provision of an accurate neural network which may be fabricated inexpensively.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIGS. 2(a)–2(k) illustrate modified forms of the architecture of FIG. 1 wherein an incident image is projected onto an array of photoconductors to accomplish specified neural functions;

FIGS. 6(a)–6(h) illustrate several examples of images used to train the network to recognize a series of human faces;

FIGS. 9(a)–9(j) illustrate examples of real-time classification of performance of a trained network.

DETAILED DESCRIPTION OF THE PREFERRED EMBODIMENT

Figure 1A:
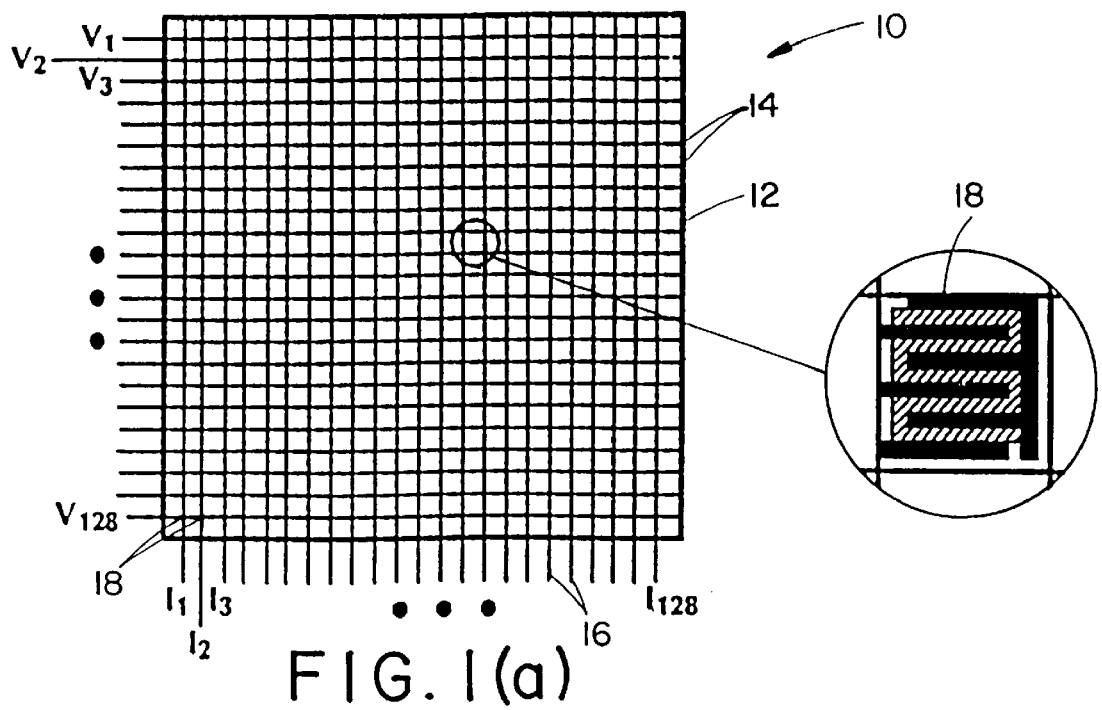
FIGS. 1(a) and 1(b) illustrate, in schematic form, an architecture of a three-layer perception network of the subject invention.

Referring now to the drawings wherein the showings are for the purposes of illustrating the preferred embodiment of the invention only and not for purposes of limiting same, the general architecture of the photoconductor array and its combination with the LCD will be described first. A description of an extension of the architecture to allow direct optical input will follow. Thereafter, an extension of the conventional backpropagation training algorithm is described, which allows the capture and adaptive input filtering of the optical image to be incorporated into the training process. Thereafter, examples are given of the network performance on two classification problems, handprinted digits and recognition of faces. Finally, improvements in the network architecture are discussed, which should lead to more powerful image capture and more efficient use of the hardware circuitry.

FIG. 1$b$ illustrates an optically-addressed neural network A of the subject invention.

The key elements of the optically-addressed neural network have been described in detail elsewhere, and hence will only be briefly discussed here. The network is based upon the combination of a two-dimensional array of photoconductors, with an LCD that is aligned above the sensor array. The photoconductive array is then illuminated through the LCD. A schematic 10 of the two-dimensional photoconductor array 12 is shown in FIG. 1($a$). It consists of a grid of 128 horizontal lines 14 and 128 vertical lines 16, with an interdigitated a-Si:H photoconductive sensor fabricated at each node 18 of the grid. Thus at each node 18 is a resistive interconnection, which is optically programmed by varying the light incident upon it through a generally aligned LCD panel, as shown in FIG. 1($b$) as 20. The system is suitably configured so that voltages are applied along the horizontal lines 14 of the array, with currents measured through the vertical lines 16, which are advantageously held at virtual ground potential. The vertical lines 16 are suitably paired to allow bipolar weighting in the neural network. The 64 pairs of vertical lines 16 are fed into 64 nonlinear differential transresistance amplifiers 30. The outputs of these 64 amplifiers are routed back to the bottom 64 horizontal conducting lines 24 of the sensor array (see FIG. 1$b$).

A pitch of the photoconductor array in both the horizontal and vertical directions is suitably 272 $\mu$m. An active-matrix LCD (also sometimes called LCD array) 20, whose pixel pitch is 68 $\mu$m, is aligned in the preferred embodiment directly above the photoconductor array (also sometimes called sensor array) 12; so that groups of 4×4 LCD pixels mask each photoconductive sensor beneath. The LCD and sensor array are then illuminated by a relatively collimated light source, such as a common 35 mm projector.

In FIG. 1($b$) is shown schematically how the system is driven to implement a standard perception network with one hidden layer. The LCD array 20 is maintained in a minimum transmission state, except for two rectangular areas which correspond to the weight fields $w_{kj}^1$, between the input-layers 24 and hidden-layers 26, and $w_{lk}^{11}$, between the hidden-and output-layers of the network, respectively. In the system of FIG. 1($b$) the network has J input neurons, which correspond to J voltages applied to a subset of the top 64 horizontal lines of the sensor array. There are K hidden-layer neurons, which because of the vertical line pairing, make use of 2K vertical lines on the sensor array. Thus the differential current that flows through each of the K vertical line pairs of the sensor array 12 correspond to the input of a hidden-layer neuron. The nonlinear transresistance amplifiers perform sigmoidal transformation of the input signals, and their output voltages correspond to the hidden-layer neurons output values. By varying the transmissiveness of LCD array 24 the rectangular region $w_{kj}^1$, interconnection weights between the input-layer and hidden-layer neurons are adjusted.

A similar rectangular region ($w_{lk}$) is defined between the K horizontal lines of the photoconductor array which carry the voltages of the hidden-layer neuron outputs, and L vertical line pairs (2L vertical lines), which carry differential currents corresponding to the output-layer neurons. This second rectangular region $w_{lk}^{11}$ defines the interconnection weights between the hidden-layer and output-layer neurons of the network. Output lines 28 are shown connected to a non-linear current-to-voltage conversion unit or amplifier 30.

Because there are 16 LCD pixels above each photoconductive sensor of the LCD array 20, and two neighboring photoconductive sensors are used to produce one bipolar weight in the network, there are 32 LCD pixels used for each interconnection weight. The LCD is capable of generating ~16 levels of gray per pixel, which should in theory allow a large number of weight levels. In the present embodiment, 129 levels of bipolar weighting are implemented, using a halftoning scheme that allows one LCD pixel of the 32 to be driven in a gray-scale mode at any given time, with all others driven in binary fashion. This approach is suitably taken to minimize the effect of LCD pixel nonuniformity, which is most pronounced when pixels are driven at intermediate gray values.

The LCD array 20 is suitably driven by a Sun IPX workstation. In addition, the top 64 lines of the sensor array are driven by digital-to-analog converters, which are suitably controlled by the same workstation. The workstation furthermore is interfaced to analog-to-digital conversion circuitry, which monitors the outputs of the 64 nonlinear transresistance amplifiers shown at the bottom of the sensor array 12 in FIG. 1 ($b$).

A suitable range of voltages applied to the top 64 horizontal lines of the sensor array is ±10 V. The nonlinear transresistance amplifiers have a small signal gain of 2×10$^8$ V/A (differential input current), and saturate in a sigmoidal fashion at output levels of ±10 V. Associating the hardware network with a theoretical network whose neurons obey a tanh(x) transformation relation, it follows that a voltage of 10 V in the hardware network corresponds to a neuron output value of 1.0 in the theoretical network. In typical operation, a single bipolar weight is found to produce a maximum differential current of 0.80 $\mu$A, resulting in a voltage of 7.4 V at the transresistance amplifier output. This implies that a single weight in the hardware network is limited to a maximum value corresponding to tanh$^{-1}$(7.4)= 0.95 in the corresponding theoretical network.

Training occurs by adjustment of the interconnection weights, using a standard backpropagation algorithm. As mentioned before, neuron output values of the hardware network are mapped to those of the standard theoretical network by equating ±10 V in the hardware network to outputs of ±1.0 in the theoretical network. The interconnection weights of the hardware network are conveniently mapped to values between ±1.0 in the theoretical network (within measurement error of the maximum measured values ±0.95). To train the network, backpropagation of the hardware network output error is performed by the digital computer. In performing the backpropagation, the output values of the hidden-layer and output-layer neurons are measured directly, and an ideal tanh(x) neuron transfer function is assumed. The weight values used in the backpropagation are the intended values which have been programmed onto the LCD array 20. Thus any nonuniformity or nonideality in implementation of the weighting through the LCD, or in the nonlinear transformation of the transresistance amplifiers, is ignored in the backpropagation. The experimental success of the network indicates that such nonidealities are compensated for in the adaptive nature of the training algorithm.

Figure 1B:
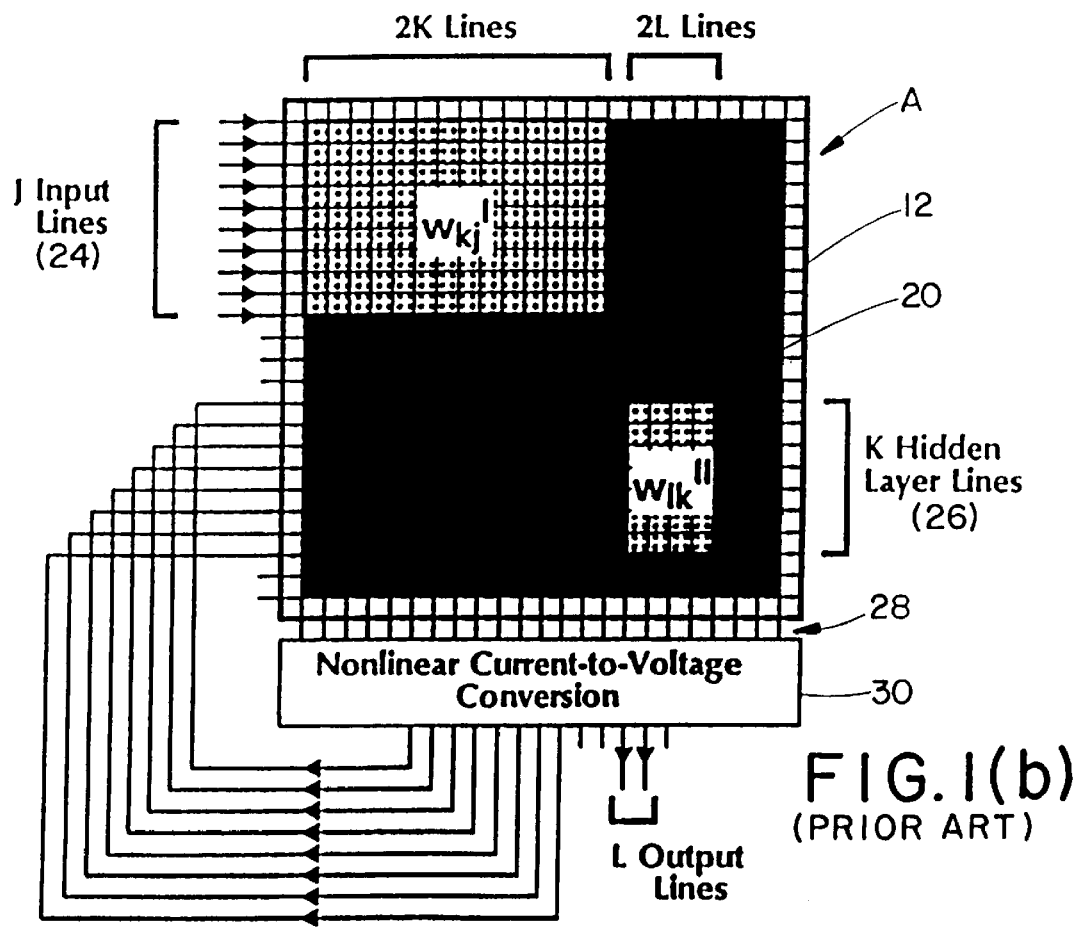

The system of FIG. 1(b) functions well as a three-layer perception network. Training in the hardware network is comparable to that of the ideal (theoretical) network, and once trained, the hardware network may be operated as a standalone processor, with a processing time of ~100 μs through the three-layer perception network.

In the system architecture of FIG. 1(b), input to the network occurs along the horizontal lines 14 of the photoconductor array, as a series of applied voltages. For many applications this may be appropriate. As discussed previously, one possible exception may occur in the case of image processing, which represents an important class of problems in the study of neural networks. For many image processing tasks it may be more desirable to create a compact network architecture that is able to sense an incident optical image and process the information directly. Because the present network is based upon the use of photosensitive array, it is natural to investigate the extension of the system to allow optical image capture.

Figure 2A:
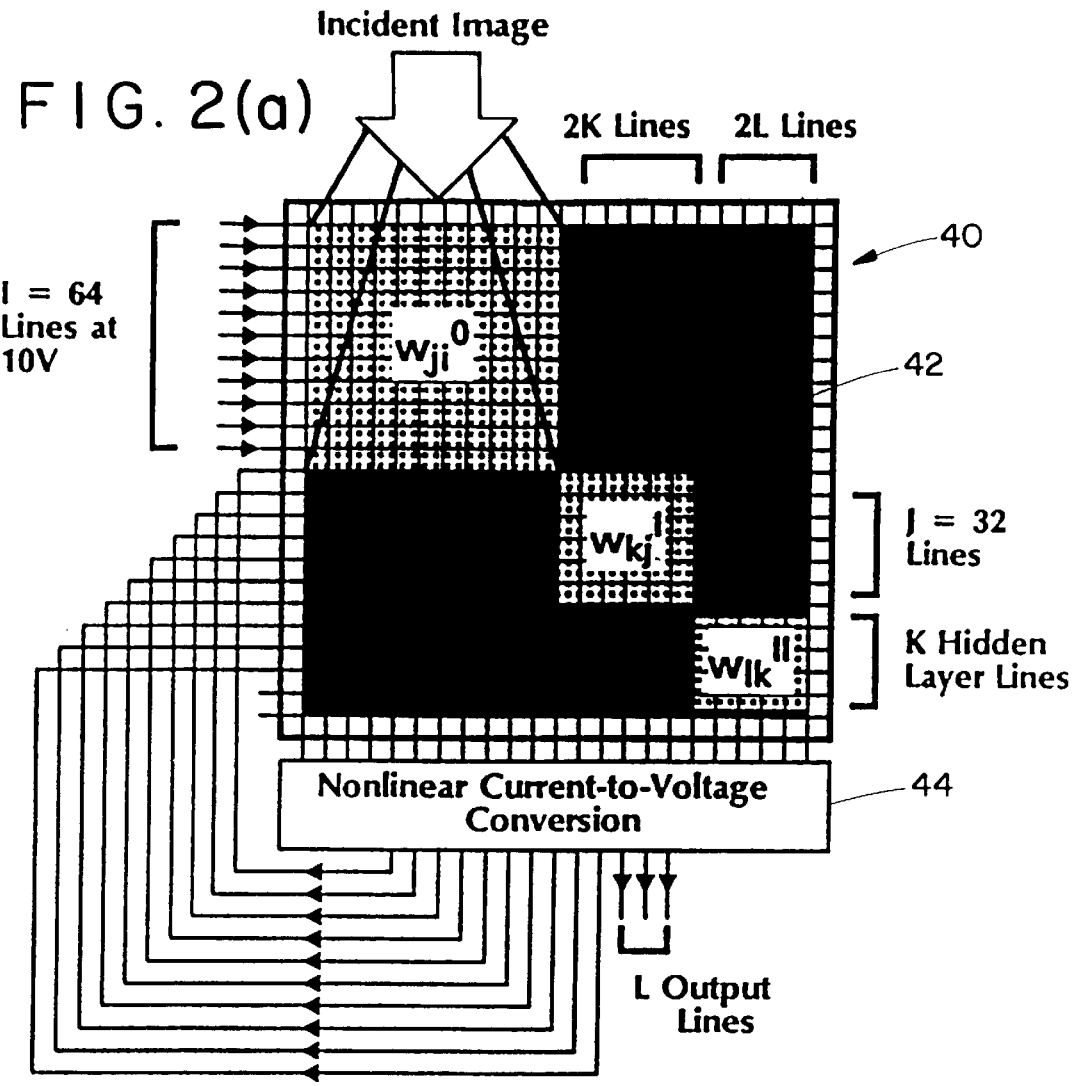

Turning next to FIG. 2(a), shown is an architecture optically-addressed neural network 40 used to directly allow optical imaging to be incorporated into the hardware neural network. A new region $w_{ji}^0$ of transmissivity in the LCD array 42 is introduced into the system, through which is sensed an optical image projected onto it in window region $w_{ji}^0$. Therefore in this system, an incident image is confined to the upper left quadrant of the sensor array suitably, covering a region of 64×64 sensor nodes. Both of the weight fields $w_{kj}^1$ and $w_{lk}^{11}$ still exist, although their location on the LCD 42 is changed, as indicated in the figure. Consideration of the architecture reveals that the photoconductive array essentially compresses the incident 64×64 pixel optical image into 32 lines of data (the 32 vertical line pairs illuminated by the incident image). These 32 lines are automatically routed into the horizontal lines of the weight field $w_{kj}^1$. The vertical lines of the weight field $w_{kj}^1$ correspond to the hidden-layer neuron inputs, and their outputs are routed once again to the horizontal lines of weight field $w_{lk}^{11}$. The output of the network is as usual associated with the vertical lines of the weight field $w_{lk}^{11}$ and is provided to amplifier 44. The amplifier 44 provides separate amplification to each signal line connected thereto.

FIG. 2(a) depicts only the column (vertical) lines being connected to amplifier (set) 44. It is to be appreciated that amplification may be alternatively provided, in whole, or in part, to selected horizontal (row) conductors. The dominant constraint is that when an impressed voltage is made on one row or column conductor, amplification must be associated with the complementary conductor of such node.

Two important points may be made immediately concerning the system of FIG. 2(a). First, the system allows the input of an image that is much larger (in terms of number of sensed pixels, here 64×64=4096) than the maximum input size of the neural network itself. This is a useful feature: it is very typical that two-dimensional images contain many more pixels than is convenient for direct input into a neural network, and hence some preprocessing transformation of the direct image is desirable (e.g. feature extraction). In the present system, the image is integrated along vertical lines, corresponding to the summing of currents in the photoconductor array. It is appreciated that for some applications, this particular method of compressing the image information may not be optimal. The issue will be discussed further below.

A second important point concerning the system of FIG. 2(a) is that the LCD array 42 may be used as a programmable filter for the imaging process. Thus the LCD may be used to specifically tailor the transformation of the input image, in a manner that is suited for a given processing task. For example, one may program the LCD over the region $w_{ji}^0$ to be sensitive to different spatial frequencies along different vertical lines of the incident image, by impressing upon the LCD patterns of appropriate spatial frequency modulation. More generally, as will be discussed below, the standard backpropagation training algorithm may be extended to allow adjustment of the weight field $w_{ji}^0$. This allows the three weights fields $w_{ji}^0$, $w_{kj}^1$, and $w_{lk}^{11}$ to simultaneously be trained to perform a given image processing task.

In the system of FIG. 2(a), the weight fields $w_{kj}^1$ and $w_{lk}^{11}$ correspond to the standard interconnection weights of a three-layer perception network, and operate in a manner entirely comparable to the original architecture of FIG. 1(b). In particular, the LCD array 42 is uniformly illuminated over the areas corresponding to these weight fields, with incident light intensity $I_0$. As discussed, for the value of $I_0$ typically used in the system, the range of these weight values may be taken to correspond to ±1.0, when mapped to a theoretical network of tanh(x) transfer function.

Figure 2B:
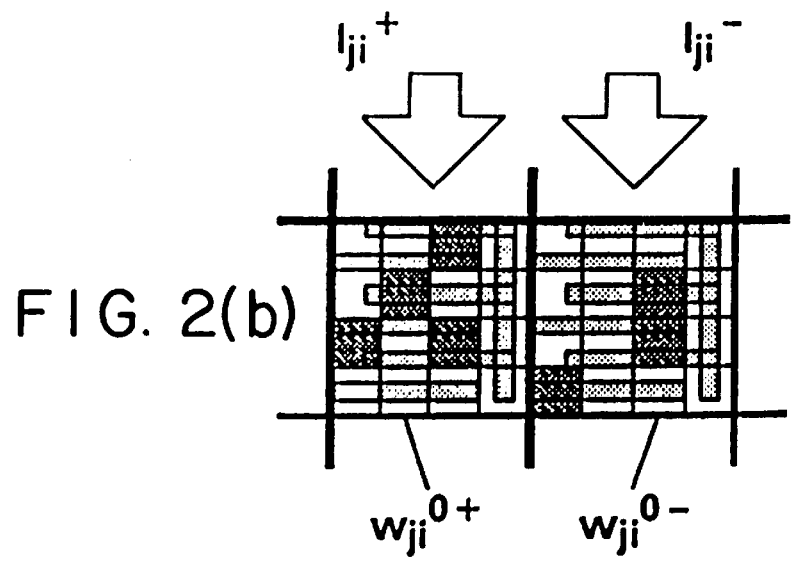
Figure 2C:
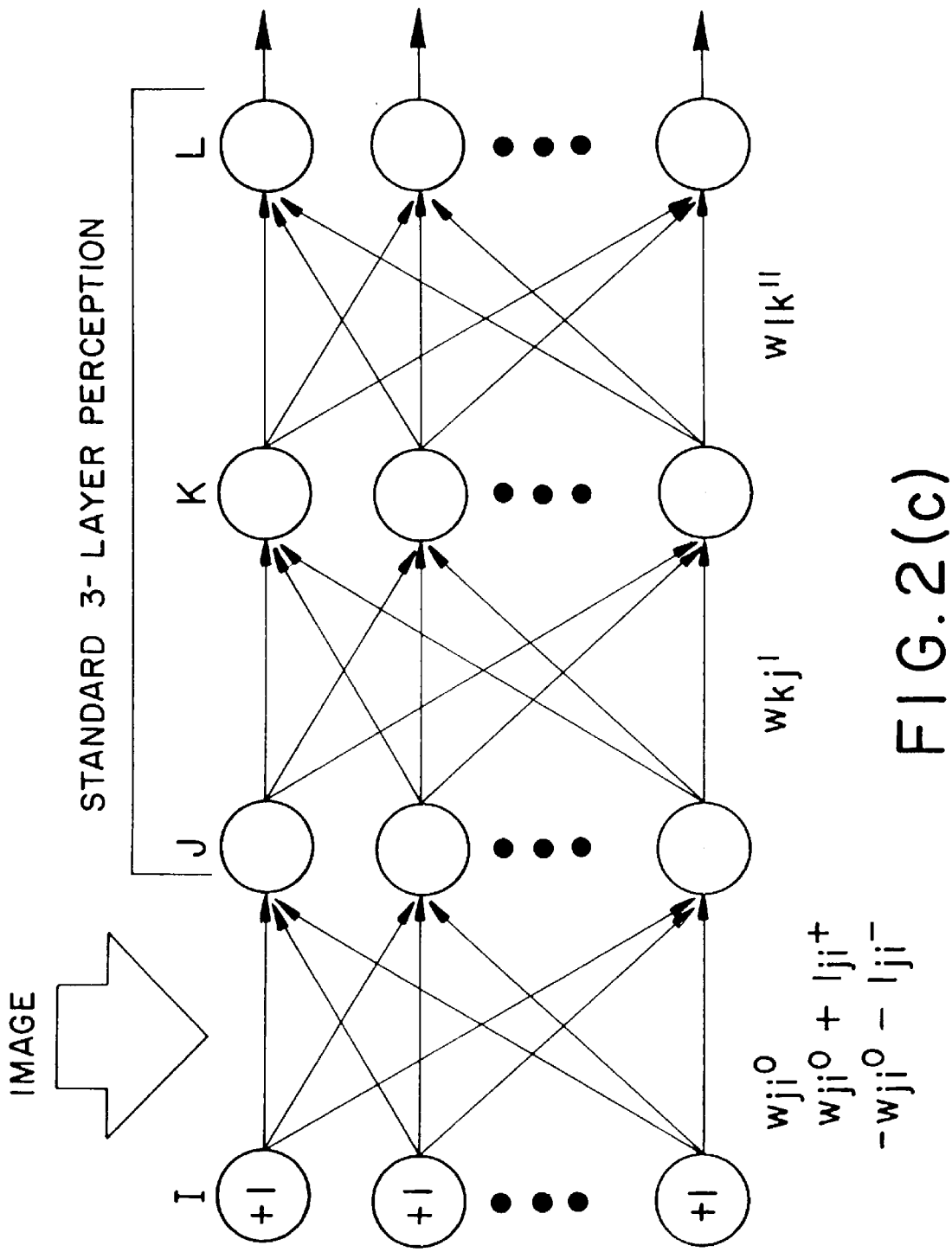
Figure 2D:
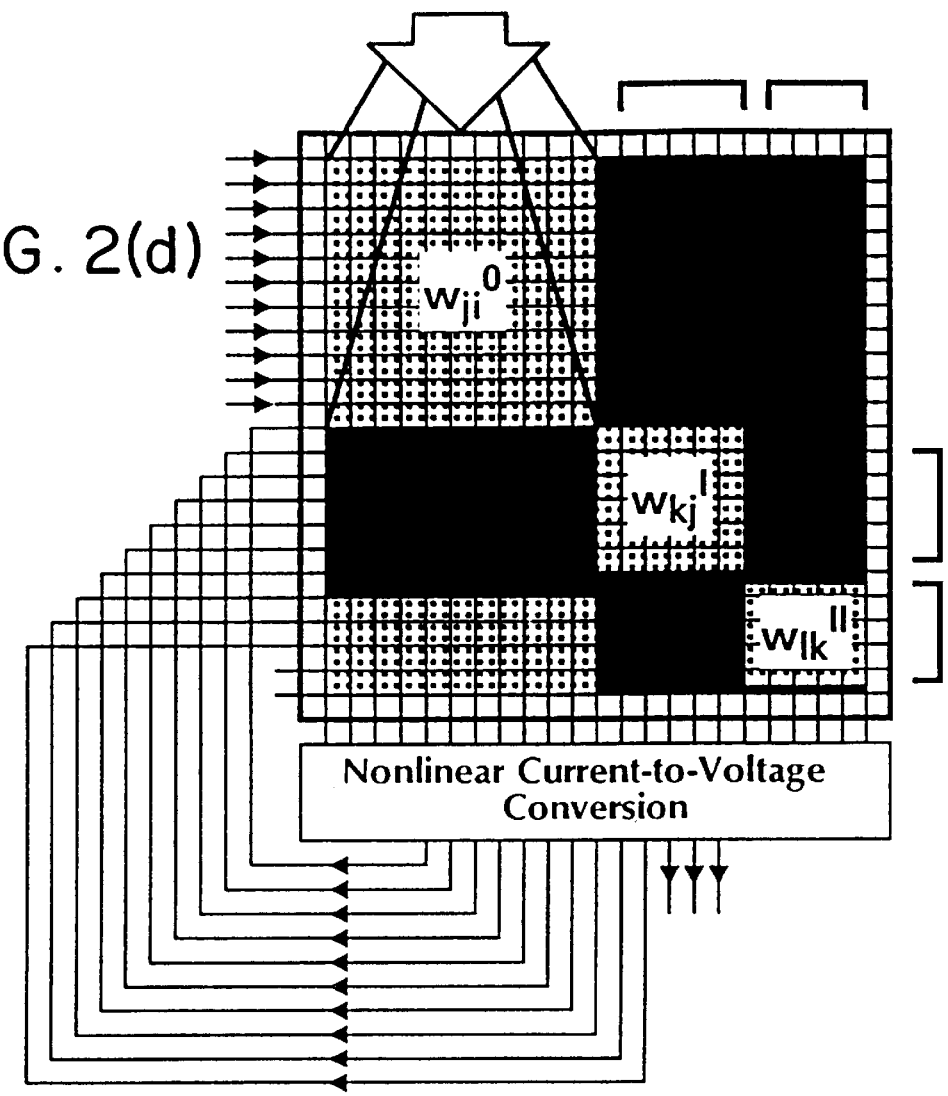
Figure 2E:
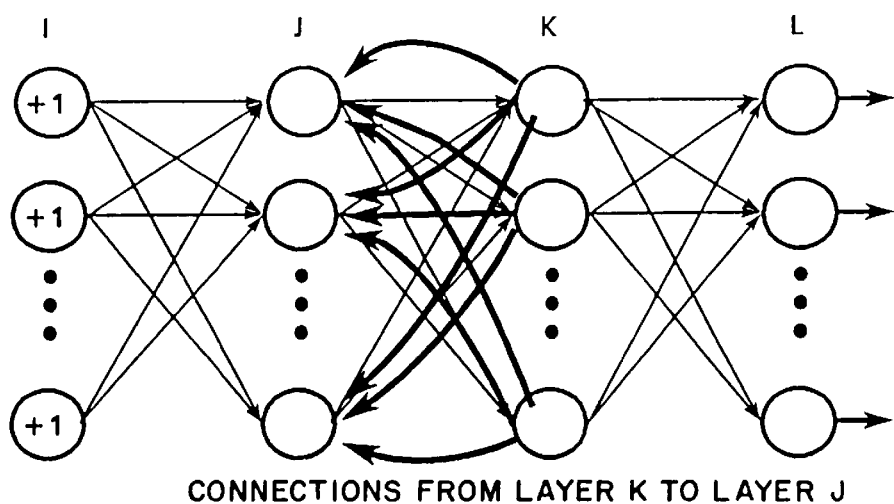
Figure 2F:
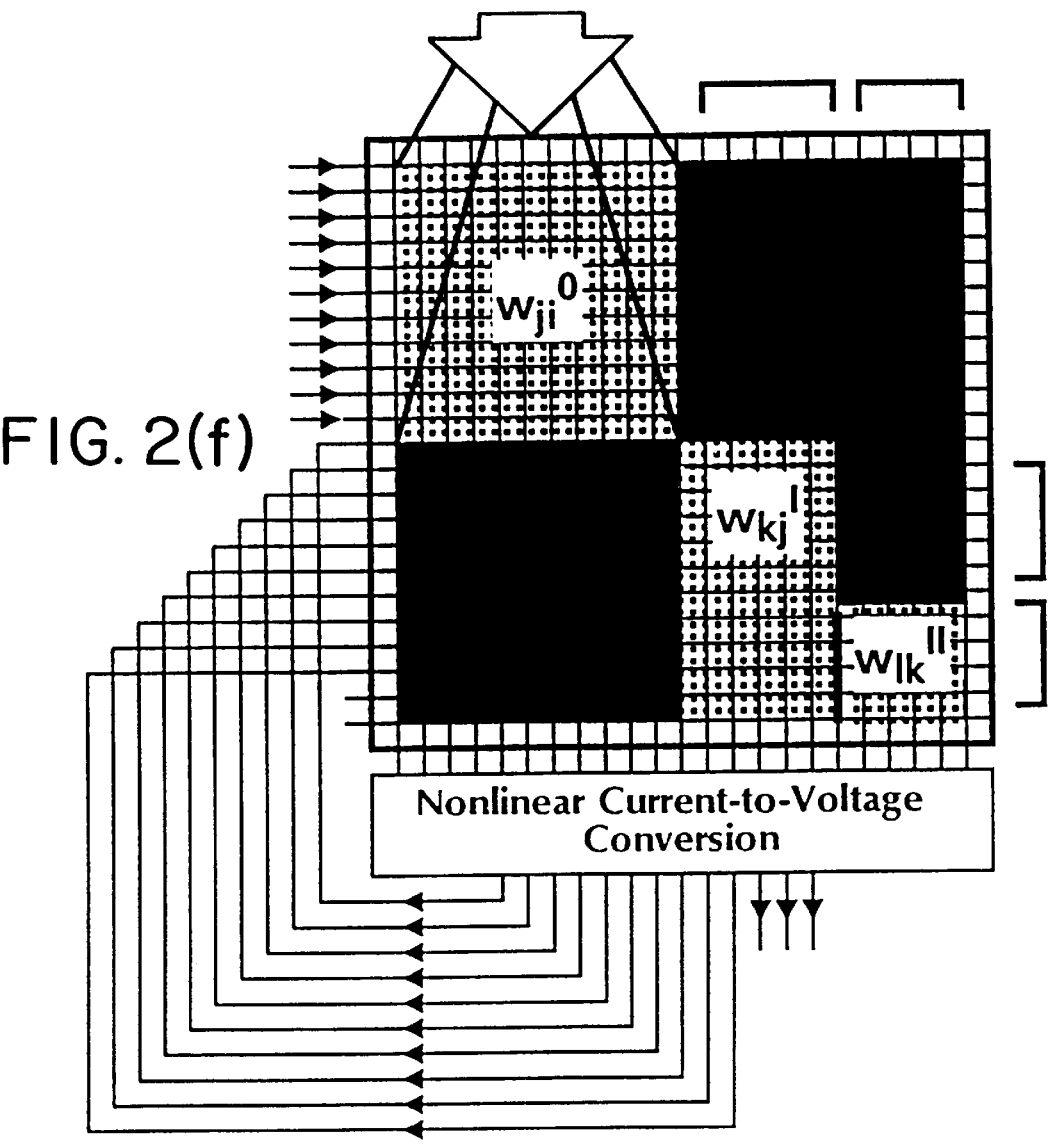
Figure 2G:
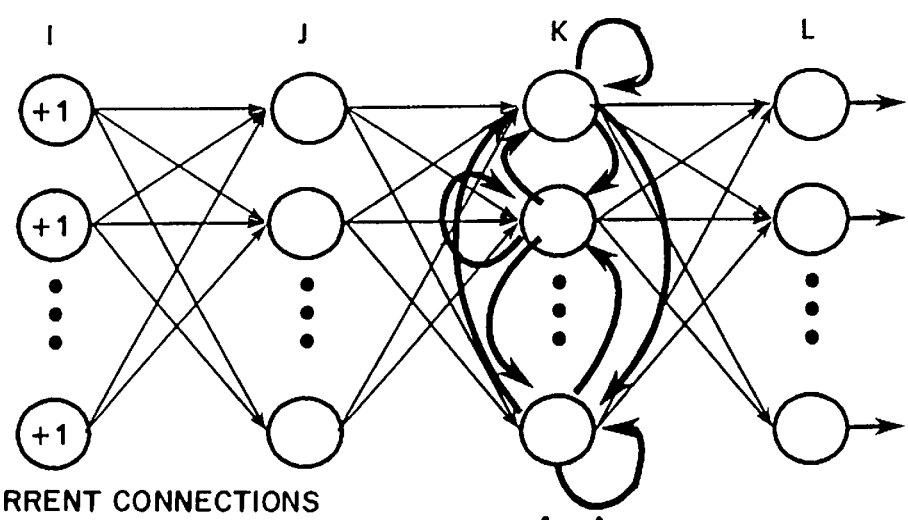
Figure 2H:
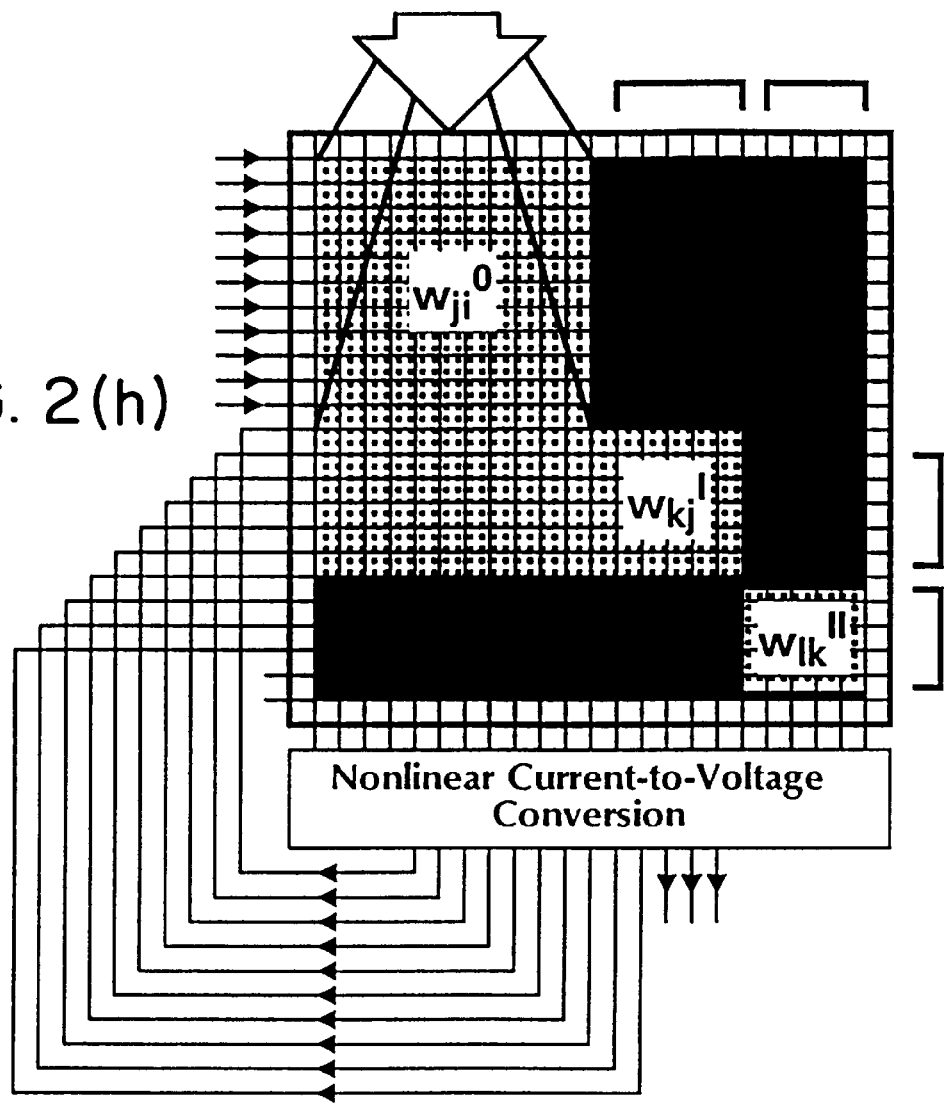
Figure 2I:
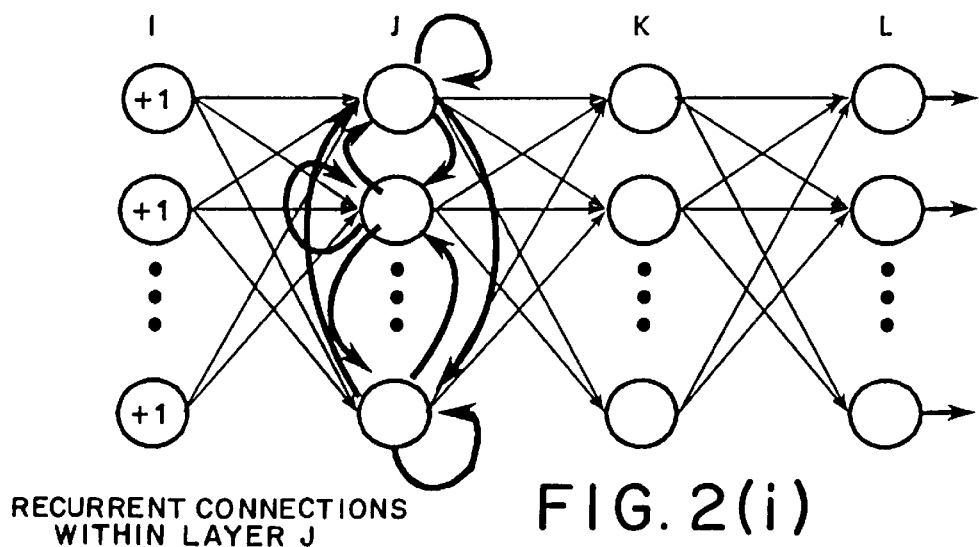
Figure 3A:
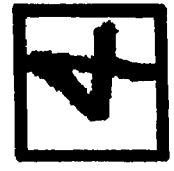
FIGS. 3(a)–3(d) illustrate a series of examples in connection with a training set for handprinted digit recognition.
Figure 3B:
Figure 3C:
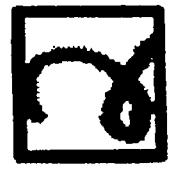
Figure 3D:
Figure 3E:
Figure 3F:
Figure 3G:
Figure 3H:
Figure 3I:
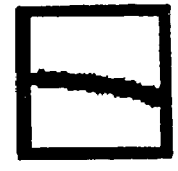
Figure 3J:
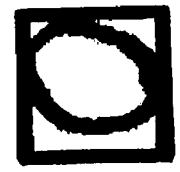

The image to be processed is projected onto the LCD over the region corresponding to the weight field $w_{ji}^0$. In this area, the incident light intensity varies spatially, and hence the underlying photoconductive sensors are affected by the product of the local LCD transmissivity and the incident illumination. As illustrated in FIG. 2(b), each weight $w_{ji}^0$ corresponds to two photoconductive sensors, due to the differential pairing of vertical lines on the array, when input to nonlinear transresistance amplifiers 44 of the system. A representative weight $w_{ji}^0$ is indicated in FIG. 2(b), with two interdigitated sensors each masked by 16 LCD pixels. The integrated transmissivities of the 16 LCD pixels above the two sensors are indicated as $w_{ji}^{0+}$ and $w_{ji}^{0-}$ in FIG. 2(b). The values $w_{ji}^{0+}$ and $w_{ji}^{0-}$ may be thought of as the weights that would be programmed if the incident illumination upon the region in question were equal to $I_0$ (in which case $w_{ji}^0 = w_{ji}^{0+} - w_{ji}^{0-}$). The actual incident illumination is labelled $I_{ji}+$ and $I_{ji}-$, where these values are normalized relative to $I_0$ (hence for an uniform illumination of $I_0$, $I_{ji}+=I_{ji}-=1.0$). With these definitions, we may write:

$$w_{ji}^0 = w_{ji}^{0+} I_{ji}^+ - w_{ji}^{0-} I_{ji}^- \tag{1}$$

Each partial weight $w_{ji}^{0+}$ and $w_{ji}^{0-}$ is now governed by a 4×4 pixel group on the LCD, which is driven in the same quasi-halftone manner as described, so that each partial weight may be programmed to one of 65 levels, corresponding to values between 0 and 1.0 in a theoretical network of tanh(x) neuron transfer function.

In the modified network of FIG. 2(a) there are still 'inputs' associated with voltages that drive the top 64 horizontal lines of the photoconductor array. In theory, these voltage levels may be included in the training process, though they remain static as different images are projected onto the LCD array 42. Upon examination of the architecture it is clear that any effect produced upon the system through variation of these 'input' voltage levels may be achieved alternatively by modification of the weight field $w_{ji}^0$, with all 'input' levels reset to 1.0 (i.e. 10 V on the sensor array) in this region. It is therefore much simpler to set all of the inputs to the weight field $w_{ji}^0$ to a value of 1.0, which corresponds to programming the top 64 horizontal lines of the sensor array to a value of 10 volts. Note that in the hardware system, this means that one 10 V power supply is able to drive the photoconductor array, greatly simplifying its operation.

The (idealized) forward propagation through the network of FIG. 2(*a*) therefore may be written as:

$$f_j = \tanh\left(\sum_i [w_{ji}^{0+} I_{ji}^+ - w_{ji}^{0-} I_{ji}^-]\right) \quad (2a)$$

$$h_k = \tanh\left(\sum_j w_{kj}^1 f_j\right) \quad (2b)$$

$$o_l = \tanh\left(\sum_k w_{lk}^{11} h_k\right) \quad (2c)$$

where $f_j$ corresponds to the compressed image information, and is the input to the subsequent three-layer perception network. The quantities $h_k$ and $o_l$ correspond respectively to the hidden-layer and output-layer neuron values. The weights $w_{ji}^{0+}$ and $w_{ji}^{0-}$ are constrained to lie within the range zero to one, and weights $w_{kj}^1$ and $w_{lk}^{11}$ are constrained to lie within the range ±1.0.

The standard backpropagation training algorithm may be extended to the architecture of FIG. 2(*a*), by appropriate chain rule differentiation to calculate the values $$\partial E/\partial W_{ji}^{0+} \text{ and } \partial E/\partial w_{ji}^{0-}$$

where E is the network error, $$E = \frac{1}{2} \sum_l (t_l - o_l)^2 \quad (3)$$

and $t_1$ is the target value for output neuron $o_1$. The resulting equations for updating the weights are:

$$\delta w_{lk}^{11}(t) = v \delta w_{lk}^{11}(t-1) + \frac{\eta}{\text{epoch\_no}} \sum_{\text{epoch}} h_k (t_l - o_l)(1 - o_l^2), \quad (4a)$$

$$\delta w_{kj}^l(t) = v \delta w_{kj}^l(t-1) + \quad (4b)$$

$$\frac{\eta}{\text{epoch\_no}} \sum_{\text{epoch}} f_j(1 - h_k^2) \sum_l w_{lk}^{11}(t_l - o_l)(1 - o_l^2),$$

$$\delta w_{ji}^{0\gamma}(t) = v \delta w_{ji}^{0\gamma}(t-1) + \quad (4c)$$

$$\frac{\eta}{\text{epoch\_no}} \sum_{\text{epoch}} I_{ji}^\gamma (1 - f_j^2) \sum_{k,l} w_{lk}^{11} w_{kj}^j (t_l - o_l)(1 - o_l^2)(1 - h_k^2).$$

Here the learning coefficient is denoted by $\eta$ and the momentum coefficient by $v$. The parameter $\gamma$ in Eq. 4(c) represents either a + or − symbol. Herein, one epoch always corresponds to the presentation of ten input images (i.e. epoch$_{13}$ no =10).

The network has been tested on two problems which form suitable examples: recognition of handprinted digits and recognition of human faces. In running the network, input images are projected onto the upper left quadrant of the LCD (see FIG. 2(*a*)), using a Sharp #XV-101TU LCD Video projector, whose video input is obtained from a video camera. The same projector is used to illuminate uniformly the weight fields $w_{kj}^1$ and $w_{lk}^{11}$ on the LCD. For both recognition tasks, the network used contains ten hidden units and five output units (thus in FIG. 2(*a*), I=64, J=32, K=10, and L=5).

In training the network, exemplar images are not projected onto the LCD using the video projector. Instead, the training images are downloaded onto the LCD directly over the weight field $w_{ji}^0$. Thus, for example, over a 4×4 pixel area of the LCD whose transmissivity would be programmed to a value $w_{ji}^{0+}$ in the trained network, the transmissivity is programmed to the value $I_{ji} + w_{ji}^{0+}$ during training. In the training phase the incident illumination over the entire LCD is uniform. This approach of imprinting the training images onto the LCD is assumed largely for convenience. Training images are stored digitally, as 64×64 pixel grayscale bitmap images. It is convenient to write these images onto the LCD during training, rather than feed them into the video projector. It would certainly be possible to use projected images for training the network, and this may yield better results in certain circumstances, as that is the mode in which the network is run, once trained.

For the problem of handprinted character recognition, the network is trained to recognize the digits 0 through 5. Because ultimately the network is expected to recognize direct, real-time images, it is not reasonable to rigorously normalize the characters to a bounding box, which is often done in such recognition tasks. It is clear however that due to the physical size limitation of the present hardware network (there are only ten hidden units), some constraint must be used in printing the digits. In creating a training set, and in testing the trained network, a peripheral box is employed inside of which the digits are printed. The digits are rendered so that they fill approximately the full height of the box (the width is not constrained). FIG. 3 shows examples of 10 training images.

In the structure exemplified by FIG. 2(*a*), realized is an optical neural network for a standard three-layer perception. The interconnection are illustrated in the node map provided FIG. 2(*c*).

FIGS. 2(*d*) and 2(*e*) show the architecture and node map associated with a further interconnection realizable by a slight variation in mask construction, i.e., connections from layer K to layer J. It will be appreciated that the system differs from that in FIG. 2(*a*) by mask/interconnections selection. Similar pairings are provided by FIGS. 2(*f*) and 2(*g*) (recurrent connection within layer K), FIGS. 2(*h*) and 2(*i*) (recurrent connections within layer J), and FIGS. 2(*j*) and 2(*k*) (connections from layer J to layer L). From these illustrations, it will be appreciated that many different neural interconnections are realizable by merely selecting the mask appropriately.

Figure 4:
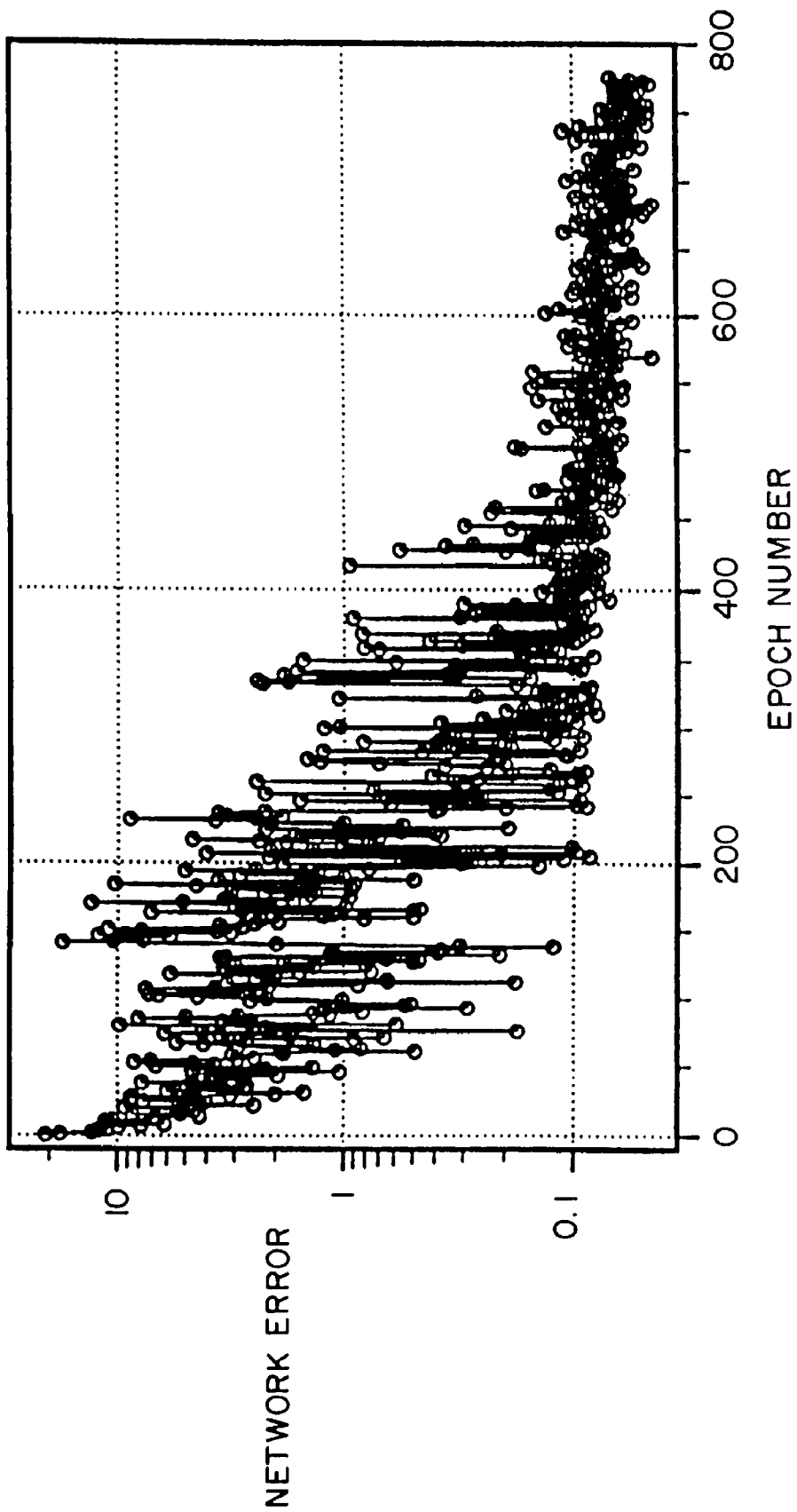
FIG. 4 illustrates a network training error for the example handprinted digit recognition.

The illustrative network is trained on 300 exemplars, with weight fields $w_{ji}^{0+}$ and $w_{ji}^{0-}$ initialized to random values in the range 0 to 0.3, and weights $w_{kj}^1$ and $w_{lk}^{11}$ randomly initialized to values in the range ±0.2. During training, as well as running of the network, the top 64 horizontal lines of the photoconductor array are maintained at 10.0 V. One output neuron is assigned to each of the five digits, and is trained to produce a value of 0.8 (i.e. 8.0 V) if the output neuron corresponds to that digit, and a value of −0.8 (i.e. −8.0 V) otherwise. In FIG. 4 are shown data of the network error during training. Once trained, the system is exercised by projecting real-time images captured using the camera/video projector combination. In FIG. 5 are shown ten test images; the network output is indicated by histograms, with the five bins corresponding to the five output neuron values.

It should be emphasized that the network response to the digits of FIG. 5 is performed in real time; the bitmap images shown in FIG. 5 were obtained by electronic scanning of the paper upon which they were written, after testing of the network.

Figure 5A:
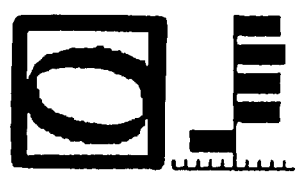
FIGS. 5(a)–5(j) illustrate, in histogram form, a typical real-time classification performance of a trained network of the subject invention.
Figure 5B:
Figure 5C:
Figure 5D:
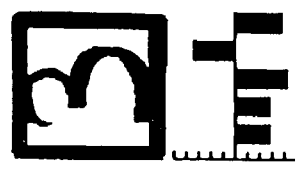
Figure 5E:
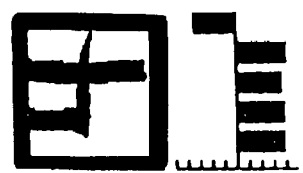
Figure 5F:
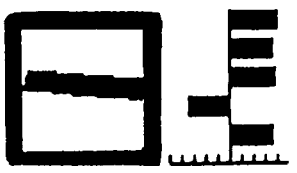
Figure 5G:
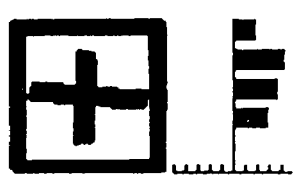
Figure 5H:
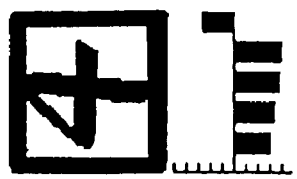
Figure 5I:
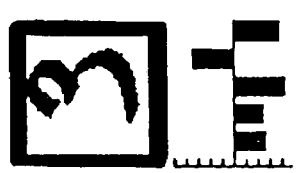
Figure 5J:
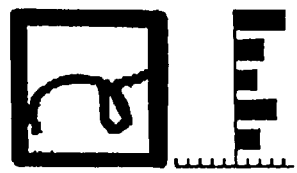

The digits and histograms of FIGS. 5(a) through 5(e) indicate the typical classification performance of the trained network. In FIGS. 5(f) through 5(h) are shown sequential images of the creation of the digit four. The first vertical stroke in rendering the digit is recognized as a 1 (FIG. 5f). After the horizontal stroke is added (FIG. 5g), the network no longer classifies the image strongly as any of the five digits. With introduction of the final diagonal stroke (FIG. 5h), the network classifies the image as that of the digit four. Note that this rendering of a four is different than that shown in FIG. 5(e): the network was trained to recognize both cases. In FIG. 5(i) an example is shown of correct classification even when the digit does not touch both the top and bottom of the bounding box. Finally, FIG. 5(j) represents a case in which the network is unable to classify the image. It is interesting to note that the trained network performed best when the bounding box was included during testing. It might have been expected that since in training the bounding box was common to all exemplars the network would learn to ignore its presence, but this was not found to be the case.

Figure 7:
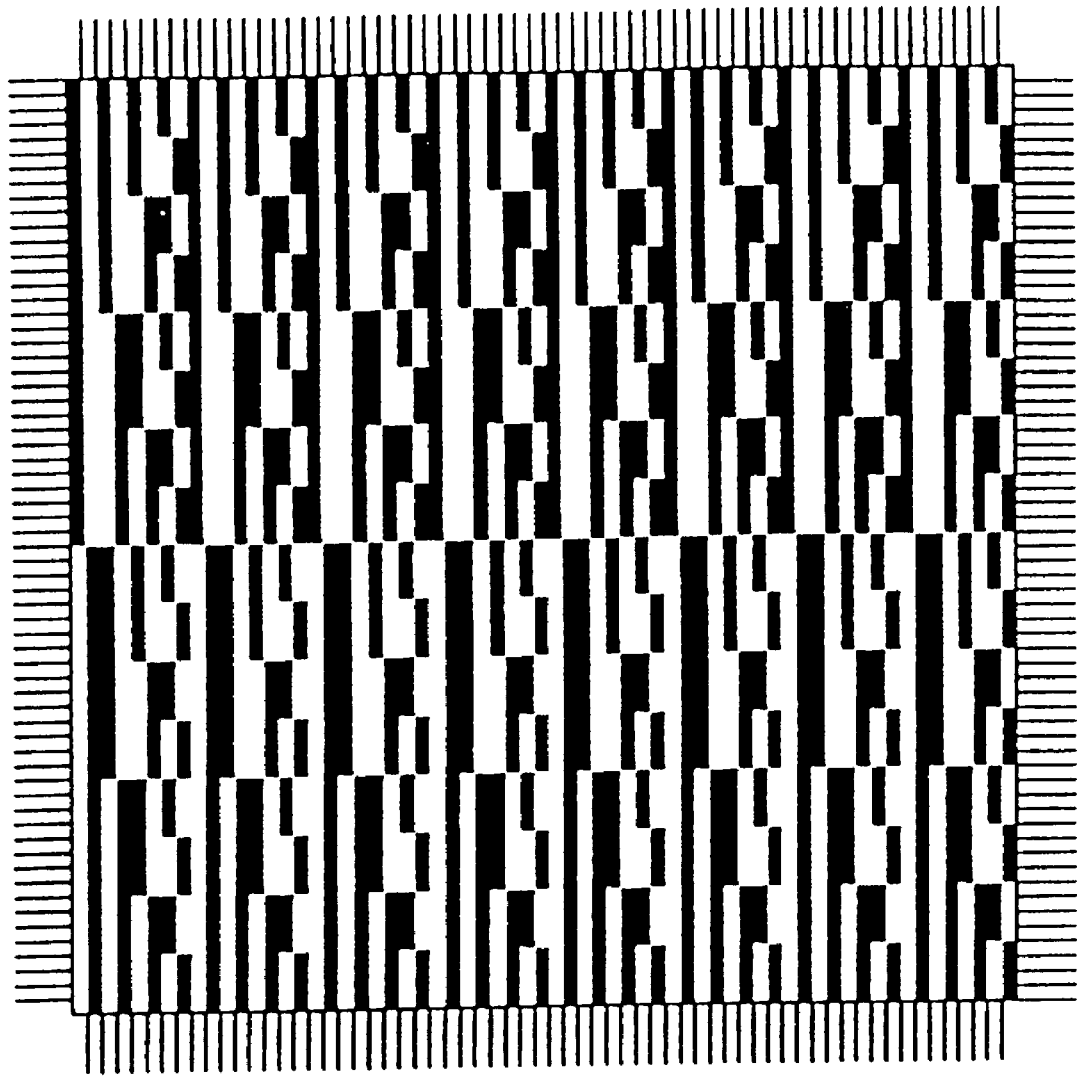
FIG. 7 illustrates a suitable liquid crystal display pattern used to filter an optical image in training a network to recognize faces, such as was provided in FIG. 6.
Figure 8:
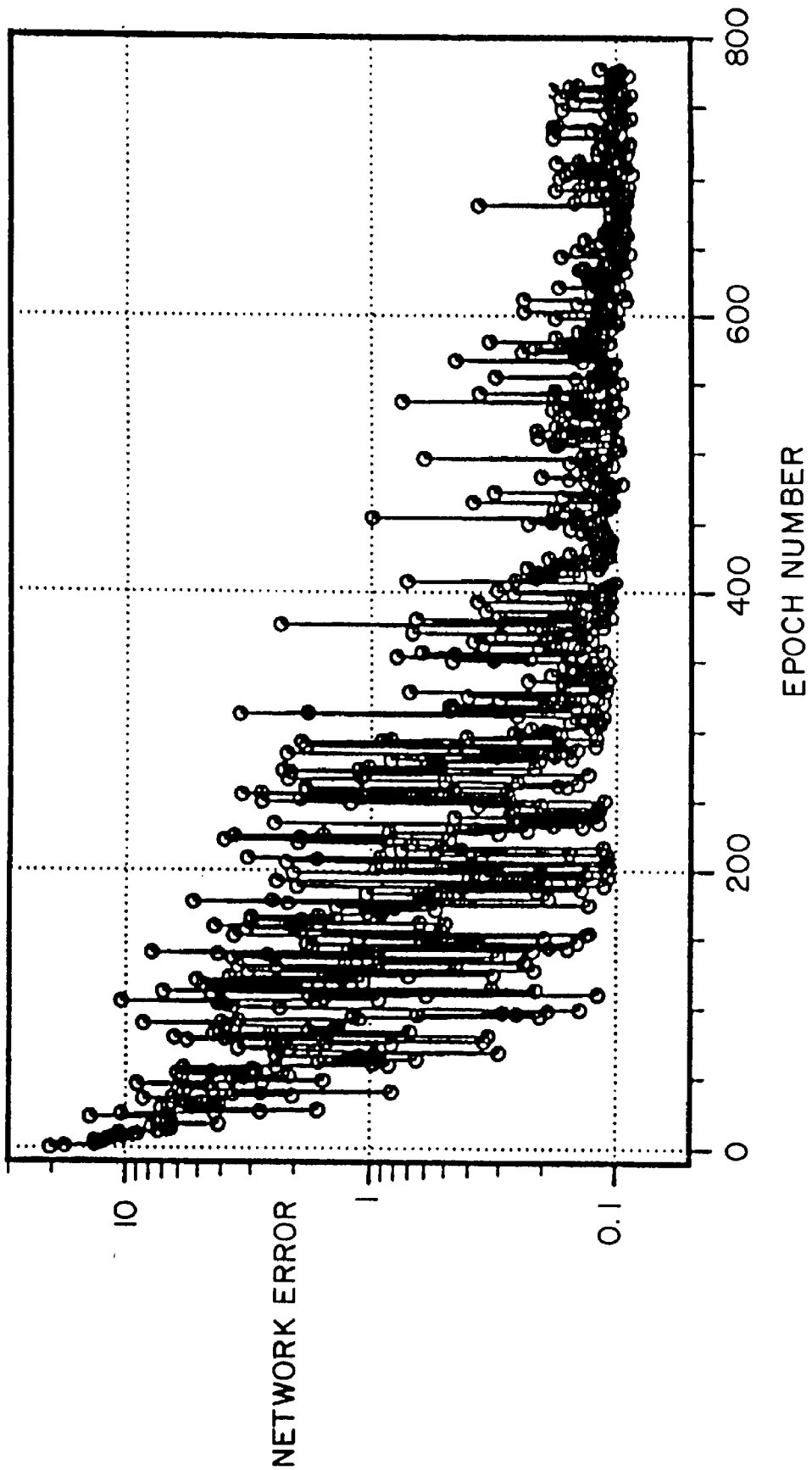
FIG. 8 illustrates a network training error for facial recognition.

Similarly, the network is trainable to recognize 64×64 pixel images of four different faces. In FIG. 6 are shown examples of eight training images. The network was trained on 250 exemplars, which included images of the faces under varying illumination, varying angle of lateral head tilt (within a lateral range of ±15 degrees from direct view), varying magnification of the face (±5%), varying translation of the head within the frame (±10%), and varying facial expression. To successfully train the network in facial recognition, it is desirable to begin with a structured weight field $w_{ji}^0$, rather than the initial random pattern that sufficed for training of the network on handprinted digits. The initial weight field $w_{ji}^0$ used for facial recognition is indicated in FIG. 7. The pattern of the weight field is seen to select different spatial frequencies of the image, along its vertical columns. Every four vertical line pairs of the sensor array (i.e. 8 lines) perform a crude spatial-frequency compression (in the vertical dimension) of the corresponding portion of the image. With this initial weight field $w_{ji}^0$, and random values for the weights $w_{kj}^1$ and $w_{lk}^{11}$, the network is successfully trainable. A typical training error curve is shown in FIG. 8. In FIGS. 9(a)–(i) are shown ten examples of the response of the trained network to real-time video images of the four faces.

In FIGS. 9(a) through 9(e) and 9(f) through 9(i) are shown examples of correct network classification. The figures represent notable variation in image capture: there is significant lateral tilting of the head in FIGS. 9(f), (g), and (i). Furthermore, the face of FIG. 9(f) is translated within the frame of the image. The illumination has been altered in generating the images of FIGS. 9(b) and 9(h). Examples of poor network classification are shown in FIGS. 9(e) and 9(j). The illumination of the head in FIG. 9(j) may be too different from that in the training exemplars for the network to correctly classify the image. The reason for incorrect classification of the image in FIG. 9(e) is not clear, but may be associated with an unacceptable reduction of the head size. These results on recognition of faces may be compared to recent work by others, using photorefractive holograms.

The disclosed network is shown to train well, considering its size, in recognition of digit and facial images. It may be noted that the results of FIGS. 4, 5, 8, and 9 are found to be very similar to simulated results of an ideal network, using Eqs. (1)–(4) to describe forward propagation and training. In particular, after 750 epochs, the training error in the simulated network is only ~30% below that of the hardware network, for both the digit and facial recognition tasks. Larger networks are currently being simulated, to understand the capability of the system.

The above results indicate the optically-addressed neural network architecture to allow direct projection of optical images onto the network, with subsequent neural network processing of the sensed images. This may be a very attractive and compact architecture for some image recognition tasks. The network, once trained, responds in real time to images projected onto it. The response time of the trained network corresponds to the combined response times of the photoconductive sensors and the nonlinear transresistance amplifier circuitry. The present transresistance amplifier circuitry has a response time of 40 $\mu$s. In previous work, it has been shown that the response time of the sensors to changes in incident illumination is of the order of 200–300 $\mu$s. This is much longer than the response time of the sensors to a change in applied voltage at constant illumination (several microseconds), and hence is expected to limit the processing speed of the trained system.

The training time of the network is limited by two factors. First, there is the time needed to measure the hardware neuron values, and perform the subsequent backpropagation of the network error in the digital computer. Second, there is the time associated with changing the pattern on the LCD array, either merely updating the interconnection weight fields, or additionally impressing the training image onto the upper-left quadrant of the LCD. In the present implementation, training occurs at a rate of 0.3 epoch/sec. (3 exemplars/sec.).

Figure 10:
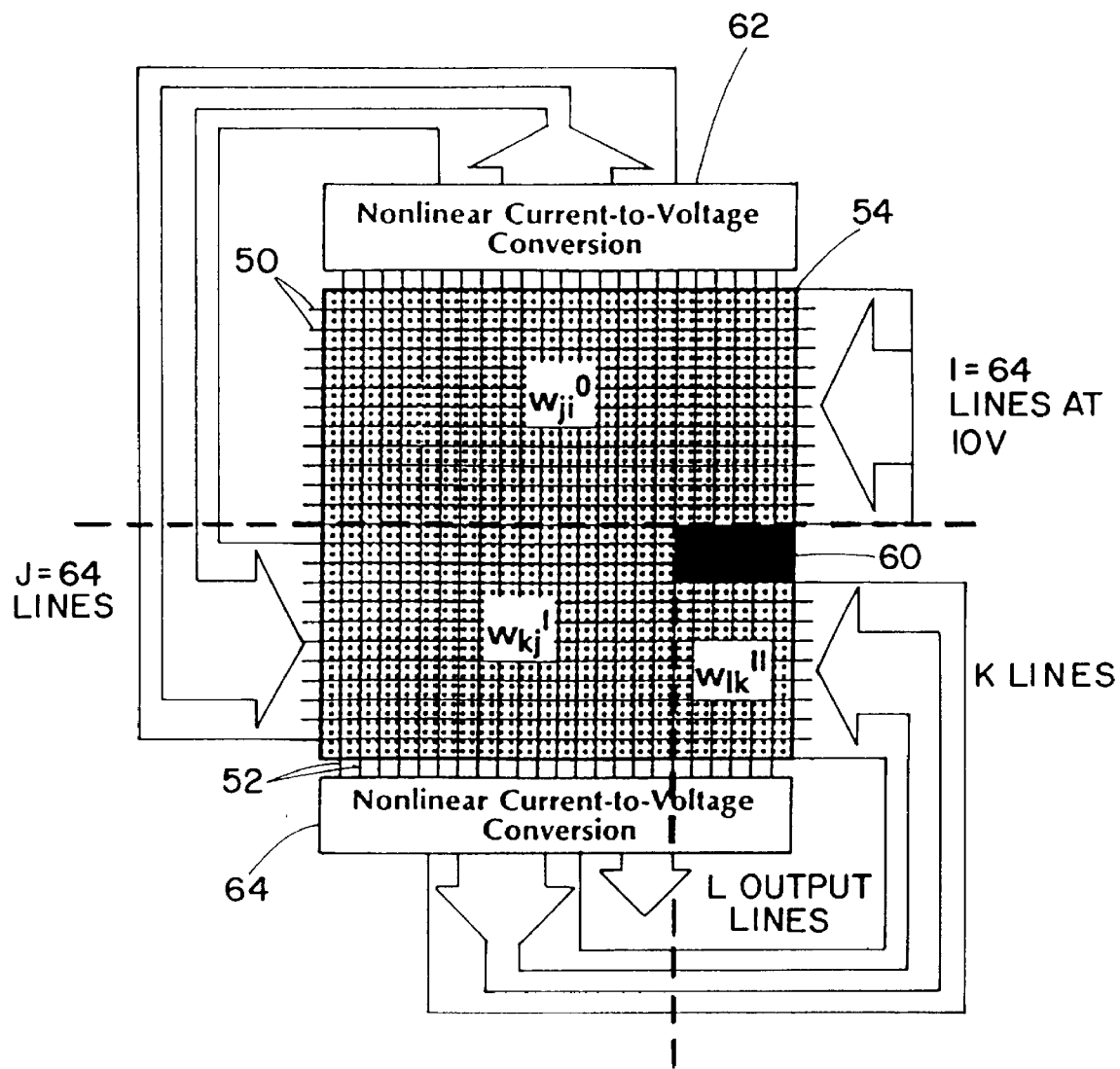
FIG. 10 illustrates a schematic of an alternative embodiment of a suitable system implementation of the subject invention.

It is useful to bring to attention the areas in the network over which the LCD pixels are maintained in a state of minimum transmittance (the black regions shown in the schematics of FIGS. 1b and 2a). These areas typically correspond to interconnections not used in the present multilayer feedforward network, such as recurrent connections within layers, or connections between non-sequential layers (e.g. between input and output layers). The ability to implement such interconnections occurs naturally in the architecture of the present system. For standard feedforward networks, this results in some inefficiency in implementation, as a significant fraction of the possible network interconnections are left unused. It is possible to implement the present feedforward architecture more efficiently by driving and sensing the horizontal and vertical lines from all four sides of the sensor array. In FIG. 10 is shown an example of such an efficient implementation. Here the conductive rows 50 and columns 52 of the sensor array 54 are severed (electrically isolated) along the two dotted lines shown. An optical image is incident upon the upper half of the sensor array and super-imposed LCD 60. The system indicated in FIG. 10 allows (64-L) hidden layer unit's with L outputs. For such a network, only $2L^2$ sensors are not utilized. Photoconductive outputs are committed to amplifiers 62 and 64. This represents a very efficient use of available interconnections.

As mentioned earlier, the image-sensing architecture of the present network may be optimized further. In the disclosed embodiment, incident optical image is integrated along vertical lines 52, due to the hardwired interconnection of the photoconductive sensor array. This sensing architecture is capable of producing successful pattern recognition. Improved network performance may be expected if the incident optical image were transformed differently upon its initial capture. In particular, rather than integrate throughout entire rows or columns of the image, it may be more suitable to capture and process local regions of the image, passing this local information on to the following layer of the network. In the region of the photoconductive sensor array dedicated to image capture, photoconductive structures (or alternatively photodiode structures) is suitably fabricated which are each sensitive to a local area of the incident image. These structures could be made to allow bipolar weighting of the incident image, if desired. Furthermore, retaining the LCD as a spatial light modulator over this region would allow the system to perform adaptive local filtering of the optical image. This approach would be more consistent with other neural network architectures which employ local feature extraction as an initial step in image processing.

Further adaptation includes the use of a lenslet array to project duplicate images onto the sensor array. In this case, any given region of the optical image would be processed by multiple sensors, allowing multiple features to be extracted for each region of the image.

In the preferred embodiment, the nonlinear current-to-voltage converters used to perform sigmoidal transformation are being integrated onto the glass substrate of the photoconductive array, using polycrystalline silicon technology. Successful integration of these amplifiers should allow the entire system to be contained within the photoconductor array substrate and LCD. In particular, only five external voltage lines will be needed to drive the entire sensor array and amplification circuitry. In addition, if after training the network to perform a specific task, LCD were replaced by an appropriate static spatial light modulator (e.g. photographic film), the entire neutral network module would require only these few input voltage lines to capture and process an incident optical image.

A hardware neural network architecture has been taught, which is capable of capturing and processing an incident optical image, in real time. The system, based on the combination of a photoconductive array and LCD, operates in a standalone mode, once trained. This architecture allows the filtering of the optical image upon capture to be incorporated into the network training process. The network has the potential to be very compact. Because all of the network components are based upon large-area thin-film technology, there is great potential for scalability and integration within the architecture.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An optically-addressed neural network comprising:
    a two-dimensional array of photo conductors defining an array of M by N array nodes, wherein M and N are defined by positive integers and wherein the nodes of each column share a common column conductor and nodes of each row share a common row conductor;
    a light mask disposed between the two-dimensional array and an associated light source such that generally collimated light therefrom is incident on a selected portion of the plurality of array nodes;
    a trainable input portion of the array of photoconductors adapted to directly receive an optical image thereon, each common row conductor of the input portion having a voltage thereon fixed a preselected level;
    a plurality of amplifiers, each operatively connected to one of (a) a selected one of the common column conductors of the array and (b) a selected one of the common row conductors of the array;
    a first plurality of conductors for impressing selected amplified signals, received from the amplifiers, to a selected array feedback portion of the common row conductors unique to those common row conductors of the input portion; and
    a second plurality of conductors, unique to the first plurality of conductors, forming a system output from selected amplified signals received from the amplifiers.

2. The optically-addressed neural network of claim 1 wherein the second plurality of conductors share no amplifier associated with any common column conductor of the input portion.

3. The optically-addressed neural network of claim 2 wherein the amplifiers are comprised of non-linear current-to-voltage converters.

4. The optically-addressed neural network of claim 3 wherein the light mask directs the generally collimated light of the associated light source to a first subset of the array elements defined as sharing no common row conductor with the input portion.

5. The optically-addressed neural network of claim 4 wherein the light mask directs the generally collimated light of the associated light source to the first subset of the array elements defined as sharing at least a portion of common row conductors associated with the system output.

6. The optically-addressed neural network of claim 5 wherein the first subset is rectangular.

7. The optically-addressed neural network of claim 5 wherein the first subset is comprised of first and second sub-portions sharing no common row conductor and no common column conductor therebetween.

8. The optically-addressed neural network of claim 5 wherein the first subset is comprised of first and second sub-portions sharing no common row conductor therebetween.

9. The optically-addressed neural network of claim 5 wherein the first subset is comprised of first and second sub-portions sharing no common column conductor therebetween.

10. The optically-addressed neural network of claim 9 further comprising a second subset of array elements sharing at least one of no column conductor and no common column conductor with one of the first and second sub-portions.

11. The optically-addressed neural network according to claim 1 wherein a single power supply supplies the voltage at a fixed preselected level.

12. The optically-addressed neural network according to claim 1 wherein intensity of the optical image varies spatially.

13. The optically-addressed neural network of claim 1, wherein at least one of each of the common row and common column conductors are configured to sum currents from photoconductors associated with the at least one of each of the common row and common column conductors.

14. The optically-addressed neural network of claim 1 wherein the data generated from the input of the optical image is compressed.

15. An optically-addressed neural network comprising:
    a two-dimensional array of two-terminal photoconductors disposed in an array of M rows by N columns, wherein M and N are defined as positive integers, wherein
    a first terminal of each photoconductor in each row M of N photoconductors is connected in common to a row M conductor, and a second terminal of each photoconductor in each column N of M photo conductors is connected in common to a column N conductor;

a two-dimensional mask, generally parallel to the array, disposed between the array and an associated, relatively collimated light source, the mask including, a plurality of selected subareas, each being set to a selected translucence level;

a plurality of J adjacent input conductors, each being electrically coupled to a corresponding one of the row conductors, wherein J is an integer less than M;

a network of amplifiers electrically coupled to each column conductor such that N amplified column signals are generated thereby;

an electrical coupling between each of a first subset of the N amplified column signals and corresponding adjacent ones of the row conductors unique to the J row conductors; and an output formed from a second subset of the N amplified column signals unique to the first subset thereof;

the selected subareas of the mask including, a first window portion defining light passing therethrough so as to affect a subset $w_{kj}$ of the photoconductors, which subset is defined by a subset of the columns of the photoconductors in the J rows, a second window portion defining light passing therethrough so as to affect a subset $w_{lk}$ of the photoconductors, which subset is defined by a subset of the columns of the photoconductors not disposed in the J rows, and a third window portion so as to communicate the optical image to an area $w_{ji}$ of the photoconductors, which area shares no column conductor or row conductor with the conductors within $w_{kj}$ or $w_{lk}$, and wherein column conductors associated with photoconductors of the area $w_{ji}$ comprise the J input conductors.

16. The optically-addressed neural network of claim 15 wherein the mask includes a generally opaque portion so as to prevent light from substantially affecting the photoconductors on all areas of the two-dimensional array other than $w_{kj}$ and $w_{lk}$.

17. The optically-addressed neural network of claim 16 wherein photoconductors of the areas $w_{kj}$ and $w_{lk}$ share no column conductor and no row conductor.

18. The optically-addressed neural network of claim 15, wherein at least one of each of the common row and common column conductors are configured to sum currents from photoconductors associated with the at least one of each of the common row and common column conductors.

19. The optically-addressed neural network of claim 15 wherein the selected translucence level is obtained by training the neural network configured such that information is input between nodes rather than at nodes.

20. The optically-addressed neural network of claim 15 wherein the data generated from the input of the optical image is compressed.

21. A neural method comprising the steps of:

transmitting an optical image, via a light mask disposed between a two-dimensional array of photoconductors defining a plurality of array nodes and a source of the optical image, to a selected area of the two-dimensional array, whereby the optical image is directly input into a trainable neural network, the selected area of the photoconductor array being selected in accordance with a training of the neural network, the training including inputting information between the array nodes rather than at the array nodes;

amplifying signals which are a function of the optical image input to the array nodes, with a plurality of amplifiers;

impressing at least some of the amplified signals, received from the amplifiers, to an array feedback portion of the array nodes; and generating an output signal formed as a result of the received optical image.

22. The method of claim 21 wherein the step of transmitting the optical image to the selected area includes a step of selectively maintaining subportions of the mask at a substantially opaque transmissivity.

23. The method of claim 21 wherein the step of generating the output signal includes outputting a portion of the amplified signals, as the output signal.

24. The method of claim 21 wherein the step of impressing includes the step of impressing the amplified signals to the array feedback portion defined as unique to the first defined subset.

25. The method of claim 21 further comprising a step of compressing data generated from the input of the optical image.

26. An optically-addressed neural network comprising a two-dimensional array of photoconductors defining an array of M by N array nodes, wherein M and N are defined by positive integers and wherein the nodes of each column share a common column conductor and nodes of each row share a common row conductor;

an input portion of the photoconductor array adapted to directly receive an optical image thereon, the photoconductor array including a weight field adapted to receive input data corresponding to the optical image, thereby allowing training of the input portion;

a subset of the photoconductor array defined as sharing no common row conductor with the input portion, the subset comprised of first and second sub-portions sharing at least one of no common column conductor and no common row conductor;

a light mask disposed between the two-dimensional array and an associated light source such that generally collimated light therefrom is incident on the subset of the photoconductor array;

a plurality of amplifiers, each operatively connected to one of the common column conductors of the photoconductor array;

a first plurality of conductors for impressing selected amplified signals, received from the amplifiers, to a selected array feedback portion of the common row conductors unique to those common row conductors of the input portion; and a second plurality of conductors, unique to the first plurality of conductors, forming a system output from selected amplified signals received from the amplifiers.

27. The optically-addressed neural network of claim 15 wherein the second subset is formed from amplified column signals associated with one-half the number of column conductors of $w_{lk}$.

* * * * *